United States Patent [19]

Kok et al.

[11] Patent Number: 5,451,155
[45] Date of Patent: Sep. 19, 1995

[54] INSTALLATION FOR MANUFACTURING REGISTRATION CARRIERS

[75] Inventors: Ronaldus J. C. M. Kok, BE Eindhoven; Gerardus A. J. M. Van Leeuwen, XE's Hertogenbosch; Joery J. Sinkeldam, VE Eindhoven, all of Netherlands

[73] Assignee: Od & Me B.V., Netherlands

[21] Appl. No.: 77,997

[22] Filed: Jun. 18, 1993

[30] Foreign Application Priority Data

Jun. 18, 1992 [NL] Netherlands .................... 9201075

[51] Int. Cl.⁶ .................... B29C 45/03; B29C 45/42
[52] U.S. Cl. .................... 425/183; 425/186; 425/190; 425/589; 425/436 R; 425/453; 425/810
[58] Field of Search ............... 264/106, 107; 425/810, 425/183, 186, 589, 436 RM, 436 R, 443, 453, 190

[56] References Cited

U.S. PATENT DOCUMENTS

| | | | |
|---|---|---|---|
| 4,379,685 | 4/1983 | Tada et al. | 425/183 |
| 4,449,907 | 5/1984 | Yonezawa et al. | 425/183 |
| 4,449,916 | 5/1984 | Ito et al. | 425/810 |
| 4,472,127 | 3/1984 | Cyriax et al. | 425/183 |
| 4,581,188 | 4/1986 | Westerman | 425/810 |
| 4,731,013 | 3/1988 | Schrammel | 425/810 |
| 4,737,096 | 4/1988 | Poorten | 425/810 |
| 4,772,196 | 9/1988 | Asai | 425/810 |
| 4,795,124 | 1/1989 | Nagai | 425/556 |
| 5,160,751 | 11/1992 | Eichlselder et al. | 264/107 |

Primary Examiner—Khanh Nguyen P.
Attorney, Agent, or Firm—Cushman Darby & Cushman

[57] ABSTRACT

The invention relates to an installation for manufacturing registration carriers provided with an injection molding device and with two holders supporting molding plates, which are adjustable with respect to each other between a first position, in which said molding plates bound a mold cavity, into which a material is injected by the injection molding device during operation so as to form the registration carrier, and a second position, in which the molding plates have been moved some distance apart with a view to removing the registration carrier formed. Transport means are provided on either side of the injection molding device, to move a holder supporting a molding plate from a position located at some distance from the injection molding device to a position suitable for cooperation with the injection molding device, and/or from a position suitable for cooperation with the injection molding device to a position located at some distance from the injection molding device.

12 Claims, 1 Drawing Sheet

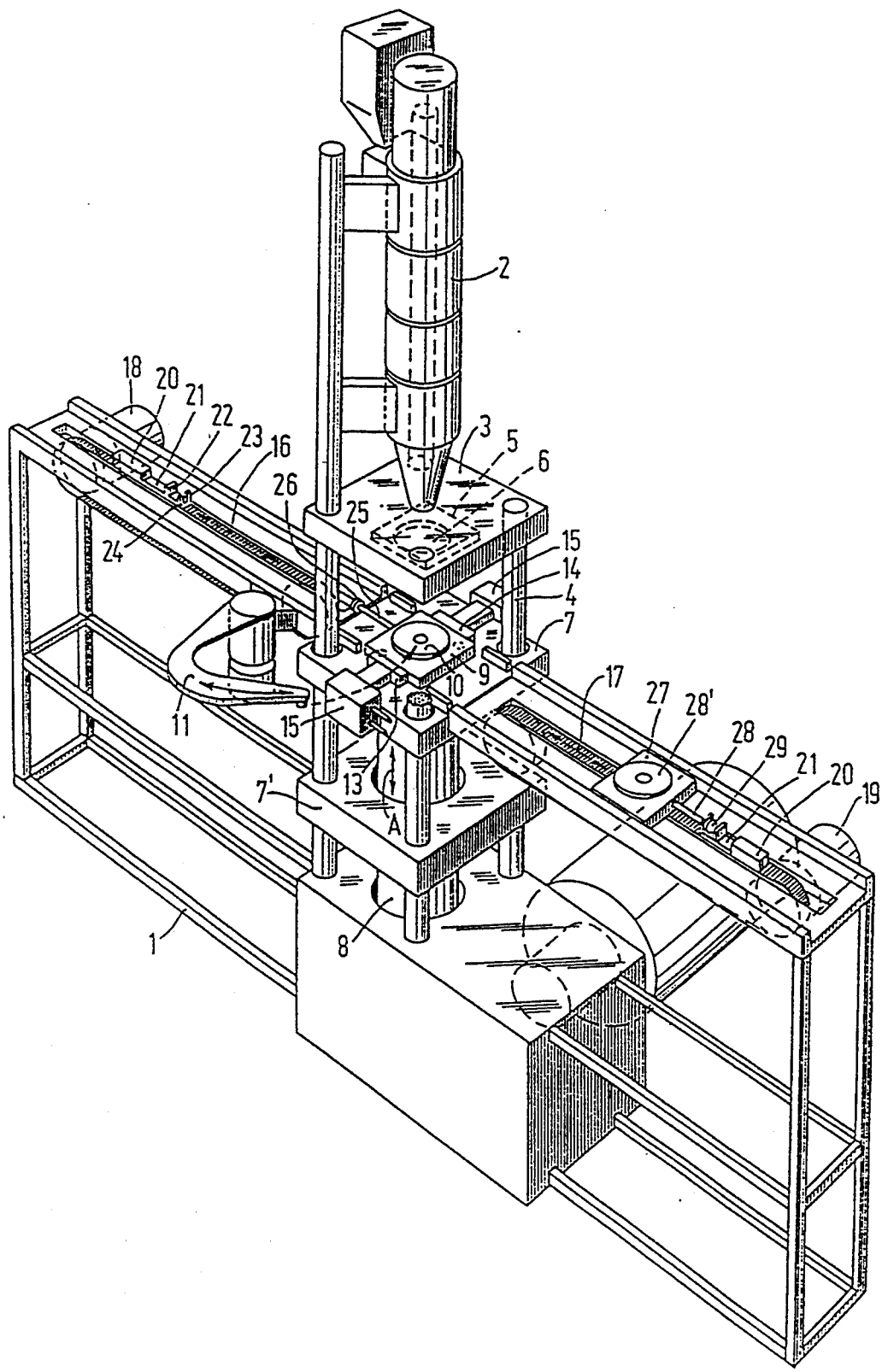

INSTALLATION FOR MANUFACTURING REGISTRATION CARRIERS

FIELD OF THE INVENTION

An installation for manufacturing registration carriers.

BACKGROUND OF THE INVENTION

The term registration carriers is understood to mean sound and/or picture carriers, data carriers and the like, for example, so-called compact discs, as well as carriers which can be processed at a later stage for storing sound, pictures or other data to be registered thereon. It will thereby be apparent to those skilled in the art that the registration carriers emanating from the installation according to the invention must generally undergo further processing operations in order to complete the registration carriers, such as, for example, the application of a metal film and the like.

With the installations of the above kind that have been usual so far at least one molding plate, that is the molding plate which exhibits a certain relief corresponding with the data to be recorded on the carrier, must be exchanged when switching over from the production of one registration carrier to another registration carrier. The other molding plate is usually a substantially smooth molding plate, which can generally remain in its place. With the installations that have been usual so far the molding plate to be exchanged must also be removed from its holder and be exchanged for another molding plate in that case. Generally this is a time-consuming activity, which requires a comparatively lengthy standstill of the machine and entails a loss of production. This loss of production becomes even larger because generally some time elapses before the holder to be exchanged has cooled down enough to be removed and the newly provided holder and the molding plate have reached the appropriate operating temperature.

From U.S. Pat. No. 2,433,654, an injection molding device is known that is provided with an upper stationary mold half and with two movable mold halves disposed at a lower level, which can alternately be positioned under the stationary mold halves and then be moved towards the stationary mold halves so as to form a closed mold cavity, into which casting material can be injected. After injection molding, the lower mold half is moved downward again, together with the product formed, and moved sideways so as to be able to remove said object from the lower mold half. In the meantime, the other one of the two lower mold halves is moved to a position under the stationary mold so as to form a next product in conjunction with said stationary mold half. No mention is made in the '654 patent of means for moving the lower mold halves.

German Patent No. 1112645 describes a device which is provided with a movable slide that supports two molds. The molds can be reciprocated by means of the slide between two devices for heating the molds and a cooling station, in which a foil is pressed onto the previously heated mold present in the cooling station so as to form a registration carrier. When a mold needs to be exchanged, it will be necessary to put the device out of operation.

SUMMARY OF THE INVENTION

The invention relates to an installation for manufacturing registration carriers. The installation includes injection molding equipment and two holders supporting molding plates. The holders are adjustable with respect to each other between a first position, in which said molding plates bound a mold cavity, into which a material can be injected by means of the injection molding device during operation, so as to form the registration carrier, and a second position, in which the molding plates have been moved some distance apart. Discharge means are also provided for removing the registration carrier formed in the second position of the molding plates.

The object of the invention is to obtain an installation wherein the above-described drawbacks of earlier types of such installations have been overcome. According to the invention, this can be achieved in that transport means are provided on either side of the injection molding device, by means of which a holder supporting a molding plate can be moved from a position located at some distance from the injection molding device to a position suitable for cooperation with the injection molding device, and/or from a position suitable for cooperation with the injection molding device to a position located at some distance from the injection molding device, whereby said transport means and said holders are provided with coupling means for detachably coupling said holders to said transport means.

When using the construction according to the invention, it is possible to set up a holder with a new molding plate at some distance from the injection molding device while the injection molding device is in operation. For exchanging the molding plates, it is only necessary then to discharge the holder supporting the molding plate used so far with respect to the injection molding device, by way of said transport means, directly contiguous to which a holder supporting a new molding plate can be moved into a position suitable for cooperation with the injection molding device. It will be apparent that in this manner the molding plates can be exchanged in a simple and fast manner, as a result of which the standstill periods of the installation during the exchange of molding plates can be minimized, and thus a large production capacity can be realized.

According to another aspect of the invention, the injection molding device is vertically disposed. Because of the vertical position of the injection molding device, a comparatively small floor surface is needed for the installation in comparison with the usual horizontal position of the injection molding device. This is advantageous not only from a point of view of space but also makes it easier to combine the installation with other devices for processing registration carriers. Another advantage of the vertical position of the injection molding device is that it is possible to set up a molding plate with a holder supporting the molding plates horizontally in the installation, in a position suitable for operation, and also to move it in a horizontal position by way of the transport means, which makes it very simple to place the holders on the transport means or place a molding plate on a holder.

A further advantage is thereby that a holder located beside the vertical injection molding device will also be readily accessible for exchanging a molding plate.

Because of the vertical position of the injection molding device, the registration carrier formed will take up a horizontal position and can remain behind on the lower molding plate when, following injection molding, the molding plates move away from each other, without having to take measures to hold down the registration carrier. The registration carrier thus lying in a horizontal position can then be readily discharged from the installation.

BRIEF DESCRIPTION OF THE DRAWING

The invention will be explained in more detail hereafter with reference to FIG. 1, which is a diagrammatic perspective view of an embodiment of an installation, according to the invention.

DETAILED DESCRIPTION OF THE INVENTION

The installation shown in FIG. 1 comprises a frame 1, which inter alia functions to support a vertically disposed injection molding device or extrusion device 2. A horizontally and fixedly disposed supporting plate or holder 3 is provided near the bottom end of the injection molding device 2. The supporting plate or holder 3 is secured to the frame by means of four columns 4. A holder or die plate 5, in which a molding plate 6 is contained, is secured to the supporting plate 3. For sound carriers only having a relieved surface at one side, the molding plate 6 will generally be a plate which is provided with a substantially smooth surface at its bottom side, and which in principle can be used for all registration carriers to be manufactured by means of the installation.

Furthermore, the installation is provided with a horizontal table 7 disposed under the supporting plate 3, extending parallel thereto, which is connected to a plate 7' disposed thereunder, which is reciprocatingly movable along the columns 4, together with the table 7, by means of a vertically disposed setting cylinder 8, as indicated by the arrow A.

A holder or die plate 9 is supported on the table 7. Holder or die plate 9 is provided with a circular disc-shaped projection 10, which is slightly conical in upward direction. The circular disc-shaped projection 10 functions to support a molding plate to be placed on the circular disc-shaped projection 10, which molding plate, at its side remote from the circular disc-shaped projection 10, will be provided in the usual manner with a relief for forming the desired relief in the registration carrier to be manufactured. By moving the holder 9 upwards by means of the table 7 and the setting cylinder 8, the projecting part 10 will be pressed into a correspondingly shaped recess in the holder 5, the two above-mentioned molding plates bounding a molding space, into which a suitable plastic material can be injected in the usual manner by means of the injection molding device 2, so as to form the sound carrier.

Then the table 7 can be moved downwards again and the sound carrier formed can be removed from the holder 9, for example, by means of an arm 11 capable of reciprocating pivotal movement about a vertical axis, said arm at its end being provided with a suitable gripping means for taking hold of the sound carrier formed. The sound carrier formed can thus be pivoted into a position beside the table 7 by means of the arm 11, and then for example be discharged into a container or be delivered to a discharge conveyor or the like.

The operation of an injection molding device and the forming of sound carriers in molding cavities bounded by molding plates are known per se and consequently need not be discussed in more detail herein.

As furthermore appears from FIG. 1, the holder supported on the table 7 is clamped down between two jaws 13 and 14, which are movable with respect to the table 7 by way of setting means 15, in a direction towards the holder 9 and in a direction away from the holder 9.

The frame 1 furthermore supports two conveyor belts 16 and 17, which are disposed on either side of the table 7 and which can be driven independently of each other by means of motors 18 and 19, respectively. As will be apparent from FIG. 1, when table 7 has been moved to its lowermost position by means of setting cylinder 8, the upper parts of conveyor belts 16 and 17 lie approximately in one plane with the upper surface of table 7. Motors 18 and 19 are reversible, so that objects can be moved by means of the conveyor belts 16 and 17, both in a direction towards the table 7 and in a direction away from said table 7.

A block-shaped catch means 20 is secured to the upper part of each conveyor belt, to which catch means an arm 21 is secured. Arm 21 extends across the upper part of the belt in question. Two ears 22 and 23, extending vertically upwards and constituting coupling means, are secured to the arm 21. The ear 23 secured to the free end of the arm 21 is provided with a slotted hole 24, which is open at the upper side of ear 23.

A rod 25, extending in the longitudinal direction of the conveyor belts and constituting a coupling means, is secured to a side of the holder 9 which extends perpendicularly to the longitudinal direction of the conveyor belts. Disc 26, forming a stop, is secured to the free end of rod 25. The end of rod 25 supporting the disc 26 slightly projects beyond table 7, seen in plan view.

In order to exchange the carrier supported by the holder 9 the conveyor belt 16 is driven in such a manner that while table 7 occupies an uppermost position, block or catch means 20 with the arm 21 secured thereto moves towards the right, as seen in FIG. 1, to such a position that when the table 7 subsequently moves downwards to the position shown, disc 26 forming a stop will come to lie between the ears 22 and 23, while rod 25 will be accommodated within the recess 24.

Then jaws 13 and 14 may be retracted by setting means 15, so that the holder 9 will be loosely supported on table 7. It will be apparent that subsequently when motor 18 operates to move belt 16 to the left, holder 9 with the molding plate supported thereon will be moved from a position suitable for cooperation with the injection molding device 2 to a position located at some distance from and beside the injection molding device and beside the table 7, when seen in plan view. In this position the holder 9 and the molding plate supported thereon are readily accessible, so that the molding plate supported by the holder 9 can be readily exchanged for another molding plate. Moving of the holder may take place directly, since the holder can be cooled in its position beside the injection molding device by means of a fluid, which can be supplied to channels provided in the holder via flexible conduits connected to the holder (not shown).

During the production of registration carriers by means of the molding plate supported by the holder 9, another molding plate can be placed on a holder 27. This can be moved in a direction towards the table 7 and in a direction away from the table 7 by means of the conveyor belt 17. For this purpose, the molding plate is again provided with a projecting arm 28 and a disc 29 acting as a stop, which is secured to the free end thereof. The position of disc 29 as shown is located between the two ears 22 and 23 of the block or catch means 20 associated with the conveyor belt 17. In this position, the holder and the molding plate can be brought up to a desired temperature thereby, for example, by passing a fluid through channels provided in the holder (not shown), by means of flexible conduits connected to the holder, so that after the holder 27 has been placed under the injection molding device, as described in more detail hereafter, no time is lost in heating up the holder before the installation can be put into operation again.

Since the operations to be carried out for exchanging a molding plate on the holder 27 are performed outside the injection molding device, damage to the fixed molding plate 6 is substantially ruled out.

It will be apparent that when the holder 9 is pulled from its position under the injection molding device towards the left, as in FIG. 1, by means of the conveyor belt 16, the holder 27 with the carrier supported thereon can simultaneously be moved under the injection molding device 2 by means of the conveyor belt 17.

After the holder 27 has thus been moved to a position under the injection molding device 2, this holder will be moved upwards by means of the table 7. The disc-shaped part 28' of this holder, which is slightly conical in upward direction, will then be pressed into the correspondingly shaped recess in the holder 5, so that an accurate centering of the holder 27 with respect to the holder 5 is effected. Following that, holder 27 can be clamped down again with respect to the table 7 by clamping down the jaws 13 and 14 by way of setting means 15. Subsequently, the production process can be repeated again.

It will be apparent that in this manner holders supporting molding plates can be exchanged in a very fast and simple manner. In addition to that, a holder located beside the injection molding device is readily accessible for exchanging molding plates.

The horizontal position of the molding plates likewise facilitates the exchanging operation. Since sound carriers are manufactured in a horizontal position, removing molded sound carriers can be carried out by simple means.

Of course, additions and/or modifications to the embodiment described and depicted are conceivable within the spirit and scope of the invention. Thus, it would, for example, be possible to move the catch means along a straight path, by means of setting cylinders disposed within the frame.

What is claimed is:

1. A registration carrier manufacturing assembly comprising:

a frame;

an injection molding device mounted to said frame;

a mold assembly comprising first and second supports operatively connected to said injection molding device, at least one of said first and second supports being movable toward and away from the other so as to define a first open and a second closed condition;

each of said first and second supports including a holder assembly that includes a molding plate mounted thereon, so that in the second closed condition a mold cavity is defined between the respective molding plates and into which molding material is inserted by said injection molding device thereby forming a registration carrier, at least one of said holder assemblies being removably mounted on its support;

registration carrier removing means for removing a carrier from between said first and second supports when in the first open condition; and a transport assembly positioned on opposite sides of said injection molding device and said first and second supports and at a level corresponding to the position of one of said supports when in the first open position, said transport assembly including means for removing the removably mounted holder assembly from the support on which it is removably mounted and for placing another holder assembly on the same support.

2. An installation as in claim 1, wherein said injection molding device is disposed vertically.

3. An installation as in claim 1, wherein one of the molding plates comprises a smooth molding surface and is fixedly disposed in an at least substantially horizontal position, while the other molding plate comprises a molding plate having a relieved molding surface and is mounted in an at least substantially horizontal position.

4. An installation as in claim 3 wherein one of said first and second supports is movable vertically in a reciprocal manner between the first open and the second closed positions and said relieved surfaced molding plate is mounted to the movable support.

5. An installation according to claim 4, wherein when said movable support is in said first open position, said holder assembly can be moved relative thereto by said transport assembly.

6. An installation as in claim 1, wherein said removably mounted holder assembly is coupled and uncoupled by relative vertical movement between said holder assembly and said transport assembly.

7. An installation as in claim 5, wherein said transport assembly is constructed in such a manner that said removing means is capable of reciprocating movement along a substantially linear path.

8. An installation as in claim 5, wherein said transport assembly includes at least one endless conveyor belt, and further including a holder assembly catch mechanism secured to said at least one conveyor belt.

9. An installation according to claim 8, wherein said at least one catch mechanism includes two upwardly extending spaced apart members, between which a stop secured to said holder assembly can be caught and retained.

10. An installation as in claim 1, wherein said registration carrier removing means includes an arm positioned adjacent said injection molding device and being pivotable about a vertical axis between a removal position overlying a formed registration carrier and a discharge position spaced therefrom, said arm further including gripping means for gripping a registration carrier.

11. An installation as in claim 1, further including means for preconditioning a holder assembly prior to movement by said transport assembly into an operating position.

12. A registration carrier manufacturing assembly comprising:

a frame;

an injection molding device mounted to said frame;

a mold assembly comprising first and second supports operatively connected to said injection molding device, at least one of said first and second supports being movable toward and away from the other so as to define a first open and a second closed condition;

each of said first and second supports including a holder assembly that includes a molding plate mounted thereon, so that in the second closed condition a mold cavity is defined between the respective molding plates and into which molding material is inserted by said injection molding device thereby forming a registration carrier, at least one of said holder assemblies being removably mounted on its support;

registration carrier removing means for removing a carrier from between said first and second supports when in the first open condition; and a transport assembly positioned on at least one side of said injection molding device and at a level corresponding to the position of one of said supports when in the first open position, said transport assembly including means for moving the removably mounted holder assembly with respect to the support.

* * * * *